United States Patent
Yogi

[11] Patent Number: 5,706,604
[45] Date of Patent: Jan. 13, 1998

[54] PLANT GROWING APPARATUS

[76] Inventor: Seigi Yogi, 48 Kehaulani St., Hilo, Hi. 96720

[21] Appl. No.: 662,987
[22] Filed: Jun. 13, 1996
[51] Int. Cl.$^6$ .................................................. A01G 9/02
[52] U.S. Cl. ...................... 47/65.5; 248/99; 248/101; 47/65.8; 220/403
[58] Field of Search ............... 47/66 B, 65 SC, 47/62, 65.5, 65.8, 66.1; 220/403, 404; 248/99, 101

[56] References Cited

U.S. PATENT DOCUMENTS

| | | | |
|---|---|---|---|
| 3,094,810 | 6/1963 | Kalpin | 47/66 B |
| 3,775,903 | 12/1973 | Pike | 47/66 B |
| 4,267,928 | 5/1981 | Curry, Jr. | 220/403 |
| 4,280,676 | 7/1981 | Betts | 220/403 |
| 4,287,701 | 9/1981 | Washington | 220/403 |
| 4,457,483 | 7/1984 | Gagné | 220/403 |
| 4,705,246 | 11/1987 | Wolf | 220/403 |
| 5,056,679 | 10/1991 | Lonczak | 220/404 |
| 5,103,587 | 4/1992 | Höller | 47/75 |
| 5,157,869 | 10/1992 | Minton | 47/73 |
| 5,358,138 | 10/1994 | Karwoski | 220/403 |
| 5,501,358 | 3/1996 | Hobday | 220/404 |

FOREIGN PATENT DOCUMENTS

| | | | |
|---|---|---|---|
| 0074637 | 3/1983 | European Pat. Off. | 47/66 B |
| 2910144 | 9/1980 | Germany | 220/404 |

*Primary Examiner*—Terry Lee Melius
*Assistant Examiner*—Joanne C. Downs
*Attorney, Agent, or Firm*—Joseph H. McGlynn; Patents & Trademark Services, Inc.

[57] ABSTRACT

An improved planting device is disclosed. A multitude of planting apparatuses are suspended from wires strung between opposing frame members of a supporting bench. The planting apparatuses comprise a rigid cylindrical pot into which a soft plastic, soil containing sleeve is inserted. The sleeve can be made deeper to contain a greater amount of soil by lifting the pot and pushing the soil medium downward. The invention therefore provides the means to bury the overgrown stalks of viny plants in a progressively deepening soil medium.

1 Claim, 1 Drawing Sheet

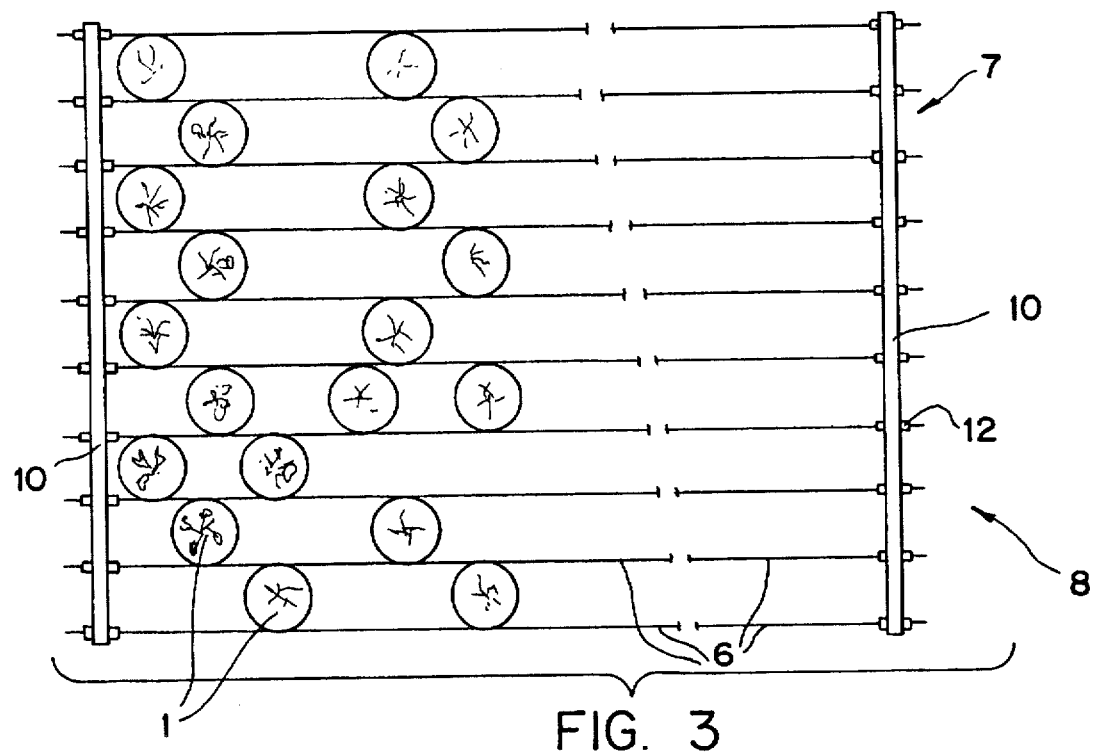
FIG. 3
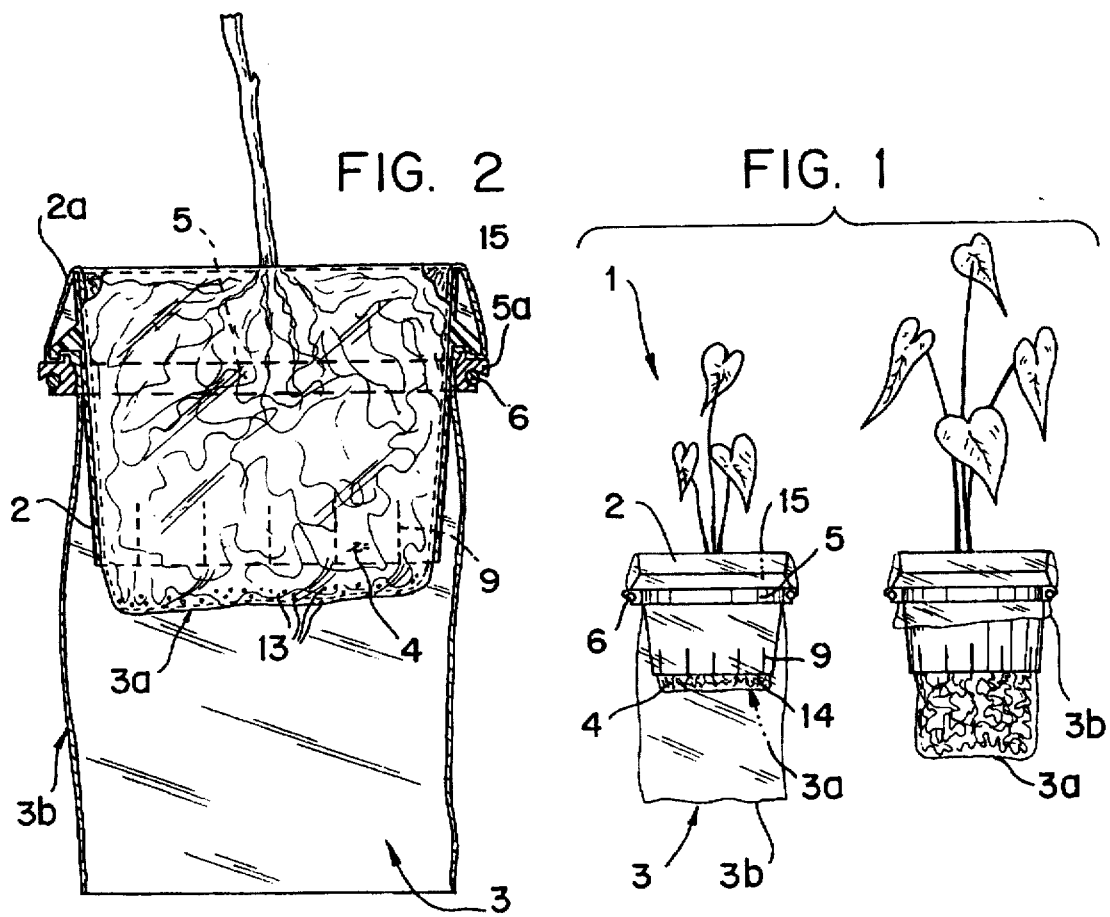
FIG. 2
FIG. 1

5,706,604

PLANT GROWING APPARATUS

BACKGROUND OF THE INVENTION

The present invention relates generally to an apparatus to facilitate the growing of viny plants and particularly to a device that enables the user to contain excess upward growth by burying overgrown stalk within a successively deepening plant medium.

Description of the Prior Art

Various plant growing devices have been developed in the prior art, often with the object of overcoming one or more of the shortcomings associated with the conventional flower pot. For example, U.S. Pat. Nos. 4,325,202 and 5,157,869 disclose pots that facilitate the removal of a plant therefrom. U.S. Pat. No. 5,327,679 discloses a pot with root growth passages to promote the health of juvenile shrubs. However, the prior art has not disclosed a device that addresses the difficulties encountered in growing viny plants such as the Anthurium Adreanum. Particularly, there remains a need for a planting apparatus that enables the user to contain excess growth and keep such plants at the optimal growth stage over the life of the plant.

SUMMARY OF THE INVENTION

The present invention provides a growth apparatus for viny plants that maintains the plant at its most productive and profitable growth stage. Viny plants such as the Anthurium Adreanum, upon reaching a certain level of growth, become top heavy and begin to droop. This condition is an unhealthy and unattractive state, and one which heretofore would require removal and replacement of the plant into a larger container with greater soil media volume. The removal process is laborious and time consuming, and can result in damage to the plant. The present invention addresses this problem by providing the means to bury the excess stalk in a progressively deepening growth medium.

The invention comprises a growing device having a soil containing means that is able to be lowered to allow for the addition of soil when the stalk of the plant is overgrown. The excess stalk is thereby buried and the plant is returned to its optimal level of growth. The soil containing means consists of a soft plastic sleeve inserted into a pot with an open bottom. The pot is suspended above the ground, and the sleeve may be lowered to contain progressively greater soil volume. The invention further comprises a bench to suspend a multitude of these containers.

Accordingly, it is an object of the present invention to provide an improved plant growing apparatus.

It is also an object of this invention to provide a plant growing apparatus particularly suited for the growth of viny plants, such as the Anthurium Adreanum.

It is a further object of this invention to provide a plant growing apparatus that contains excess growth of viny plants to maintain the plant at an optimal level of growth.

Finally, it is an object of this invention to provide a plant growing apparatus with an adjustable soil containing means capable of holding progressively deepening soil medium, and a means to suspend a multitude of such containers.

These and other objects and advantages of the present invention will be fully apparent from the following description, when taken in connection with the annexed drawings.

BRIEF DESCRIPTION OF THE DRAWINGS

FIG. 1 shows a side elevational view of two containers of the present invention with varying levels of soil volume and plant growth.

FIG. 2 shows an enlarged side elevational view of container of the present invention.

FIG. 3 shows a top view of the planting bench of the present invention, having several containers of the present invention suspended therefrom.

DESCRIPTION OF THE PREFERRED EMBODIMENT

Referring now to the drawings in greater detail, it can be seen in FIG. 1 that the present invention comprises a suspended planting apparatus 1 having a rigid upper pot 2 consisting of a hollow, tapered, cylindrical container with an open bottom 14. A hollow, cylindrical soft plastic sleeve 3 is inserted into the pot 2 and supports the soil medium 4 holding the plant. The sleeve 3 has a closed bottom portion 3a. The sleeve 3 folds inside out at the top of the pot at 2a (see FIG. 2) and drapes down over the pot, forming an outer reserve portion 3b. The sleeve 3 contains very small holes 13 to provide drainage and aeration of the soil medium 4, and should be of a thickness sufficient to avoid tearing under the weight of the soil.

As best seen in FIGS. 2 and 3 taken together, the pot 2 is suspended within a hanger ring 5. The hanger ring 5 is a rigid circular piece having a diameter greater than the bottom portion of the pot 2 and less than the upper lip 15 of the pot, so that the pot may be inserted into the hanger ring 5 and suspended therefrom. The hanger ring has a hollow groove 5a on its outer circumference. The hanger ring 5 is suspended at either end by wires 6 stretched between opposing frame portions 7 of the bench 8, as shown in FIG. 3.

The wires 6 fit within the grooved portion 5a of the hanger ring 5, as best seen in FIG. 2. The wires 6 are preferably made of metal with a plastic coating, although other materials can be used, and should be of sufficient diameter to support the considerable weight of several pots, plants and their soil media. Of course, other means to support the pots 2 may be used without departing from the scope of the invention. For example, strong nylon ropes could be used instead of the plastic coated metal wires.

As shown in FIG. 2, the sleeve 3 passes over the lower portion of the pot 2, forming a bottom for the bottomless pot. The sleeve then is placed between the outer circumference of the pot 2 and the inner circumference of the holding ring 5, and extends over the ring and then down the outside of the ring. The sleeve 3 is thus wedged between the hanger ring 5 and the pot 2, thereby, holding the sleeve securely in place so that the closed portion of the sleeve below the pot 2 is able to support the weight of the soil medium 4.

The soil capacity of the sleeve may be increased by lifting the pot 2 from the hanger ring 5, thereby releasing the reserve sleeve 3b. The soil medium 4 is then pushed downward in the pot 2. This causes some of the reserve sleeve 3b to slide further down below the bottom of pot 2, thereby increasing the soil containing capacity of the sleeve 3.

The lower portion of the pot contains slits 9 around its bottom edge (as seen in FIGS. 1 and 3) to facilitate the passage of soil medium through the open bottom of the pot. As the soil is pushed to the bottom of the pot it will tend to compact at the bottom. By making the bottom of the pot slightly expandable, through the use of slits 9, it will be easier to push the compacted soil into portion 3a of the sleeve 3.

Thus, when the plants become overgrown, the sleeve may be made deeper by the above described operation and more soil can be added to bury the overgrown stalk. The plant is thus returned to an optimal growth stage without the need to remove it from the pot or to trim it. The soil deepening operation may be performed quickly and easily with no damage to the plant, and may be performed several times during the growth of the plant.

FIG. 3 shows a top view of the bench 8, from which a multitude of planting apparatuses 1 are hung in the manner described above. The bench 8 comprises a generally parallelpiped frame 7 and wires 6 stretched between opposing lateral frame members 10. The wires 6 are wrapped at one end around tightening bolts 12 which, when turned, serve to adjust the tension on the wires 6. Of course, other means of maintaining tension on the wires may be employed without departing from the scope of the invention. The bench 8 allows the user to conveniently suspend several pots in a small area and to service the plants with minimal obstruction.

Also, it should be noted that only two stages of the plant growth are shown in FIG. 1, but there may be more stages that the plant might go through, and the sleeve may be pulled down and more soil added to support the plant several times during the growing cycle.

Although the planting device and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An improved planting device for growing vinous plants comprising:

a pot means for holding a plant and a growing medium for said plant, said pot means having an open bottom and an open top, means attached adjacent said open top for supporting said pot means, a flexible sleeve means having a closed bottom and an open top, said sleeve means extending around said pot means with said closed bottom of said sleeve means adjacent said open bottom of said pot means, and said open top of said sleeve means hanging down below said open bottom of said pot means, and wherein said pot means has an enlargement adjacent said open top of said pot means, and said supporting means is a ring that encircles said pot means below said enlargement, and wherein said ring has a groove around an outer circumference for receiving a suspension means on a plant stand, whereby said closed bottom of said sleeve means can be extended further down below said open bottom of said pot means as said plant grows.

* * * * *